US010313458B2

(12) United States Patent
Gagnon et al.

(10) Patent No.: US 10,313,458 B2
(45) Date of Patent: Jun. 4, 2019

(54) DRYER WITH COMMUNICATION INTERFACE

(71) Applicant: Excel Dryer, Inc., East Longmeadow, MA (US)

(72) Inventors: William Gagnon, Somers, CT (US); Marc Schwartz, Brooklyn, NY (US)

(73) Assignee: Excel Dryer, Inc., East Longmeadow, MA (US)

( * ) Notice: Subject to any disclaimer, the term of this patent is extended or adjusted under 35 U.S.C. 154(b) by 167 days.

(21) Appl. No.: 14/807,482

(22) Filed: Jul. 23, 2015

(65) Prior Publication Data
US 2016/0028838 A1 Jan. 28, 2016

Related U.S. Application Data

(60) Provisional application No. 62/028,067, filed on Jul. 23, 2014.

(51) Int. Cl.
*H04L 29/08* (2006.01)
*H04L 12/24* (2006.01)
*A47K 10/48* (2006.01)
*H04W 4/80* (2018.01)
*A47K 10/32* (2006.01)
*A47K 5/12* (2006.01)
*H04W 84/12* (2009.01)

(52) U.S. Cl.
CPC .............. *H04L 67/22* (2013.01); *A47K 10/48* (2013.01); *H04L 41/0803* (2013.01); *A47K 5/1217* (2013.01); *A47K 2010/3226* (2013.01); *H04W 4/80* (2018.02); *H04W 84/12* (2013.01)

(58) Field of Classification Search
CPC .... H04L 67/22; H04L 41/0803; H04W 4/008; H04W 84/12; A47K 5/1217; A47K 10/48
See application file for complete search history.

(56) References Cited

U.S. PATENT DOCUMENTS

| 7,783,380 | B2 | 8/2010 | York et al. |
| 8,382,065 | B2* | 2/2013 | Hendrickson ........... F25D 29/00 141/347 |
| 2004/0090333 | A1 | 5/2004 | Wildman et al. |
| 2009/0119142 | A1 | 5/2009 | Yenni et al. |
| 2013/0031799 | A1 | 2/2013 | Gagnon et al. |
| 2015/0052678 | A1 | 2/2015 | Bayley et al. |
| 2015/0216372 | A1 | 8/2015 | Ahmed |
| 2015/0230078 | A1* | 8/2015 | Kandangath ........ H04L 67/1095 707/647 |
| 2015/0304489 | A1* | 10/2015 | Nnaji ................... H04M 3/2281 348/14.01 |
| 2016/0119185 | A1* | 4/2016 | Negron ................ H04L 12/2807 370/255 |
| 2016/0157051 | A1* | 6/2016 | Showering ........... H04B 5/0031 455/41.1 |

FOREIGN PATENT DOCUMENTS

WO 2011074946 6/2011
WO WO 2014/033427 A1 * 3/2014 ............. A47K 10/00

* cited by examiner

*Primary Examiner* — Arvin Eskandarnia
*Assistant Examiner* — Chhian (Amy) Ling
(74) *Attorney, Agent, or Firm* — O'Shea Getz P.C.

(57) ABSTRACT

A forced air hand dryer includes a communication device that communicatively couples to a computing entity in provide data regarding the use of the hand dryer, and/or to set an operating configuration of the hand dryer.

9 Claims, 9 Drawing Sheets

DRYER WITH COMMUNICATION INTERFACE

CROSS-REFERENCE TO RELATED APPLICATION(S)

This application claims the benefit of U.S. Provisional Application Ser. No. 62/028,067, filed Jul. 23, 2014, the contents of which are incorporated herein by reference.

FIELD

Aspects of the disclosure are directed to dryers and dispensers. For example, aspects of the disclosure are directed to a hand dryer and a paper towel dispenser incorporating a communication interface.

BACKGROUND

Examples of various types of hand dryers are disclosed in U.S. Patent Application Publication No. 2013/0031799 (hereinafter, '799 publication), the contents of which are incorporated herein by reference. In particular, the '799 publication describes illustrative hand dryers that include an ion generator for providing sanitized air.

U.S. Pat. No. 7,783,380 (hereinafter, '380 patent) describes systems and methods for measuring, monitoring, and controlling washroom dispensers and products. In particular, the '380 patent describes a dispenser sensor unit in communication with a dispenser (e.g., a paper towel dispenser) that is configured for the dispensing of product (e.g., a paper towel). The dispenser sensor unit is configured to detect information about the product and for varying a dispensing parameter of the dispenser.

Further improvements to dryers and dispensers are needed.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising a hand dryer, and a communication device coupled to the hand dryer and configured to communicatively couple to a computing entity in order to provide data regarding the use of the hand dryer, and/or to set an operating configuration of the hand dryer.

Aspects of the disclosure are directed to an apparatus comprising at least one processor, and memory having instructions stored thereon that, when executed by the at least one processor, causes the apparatus to: scan a dryer system to establish wireless communication with at least one communication device, identify at least one hand dryer included in the dryer system based on the established wireless communication, and cause the identification of the at least one dryer to be presented.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
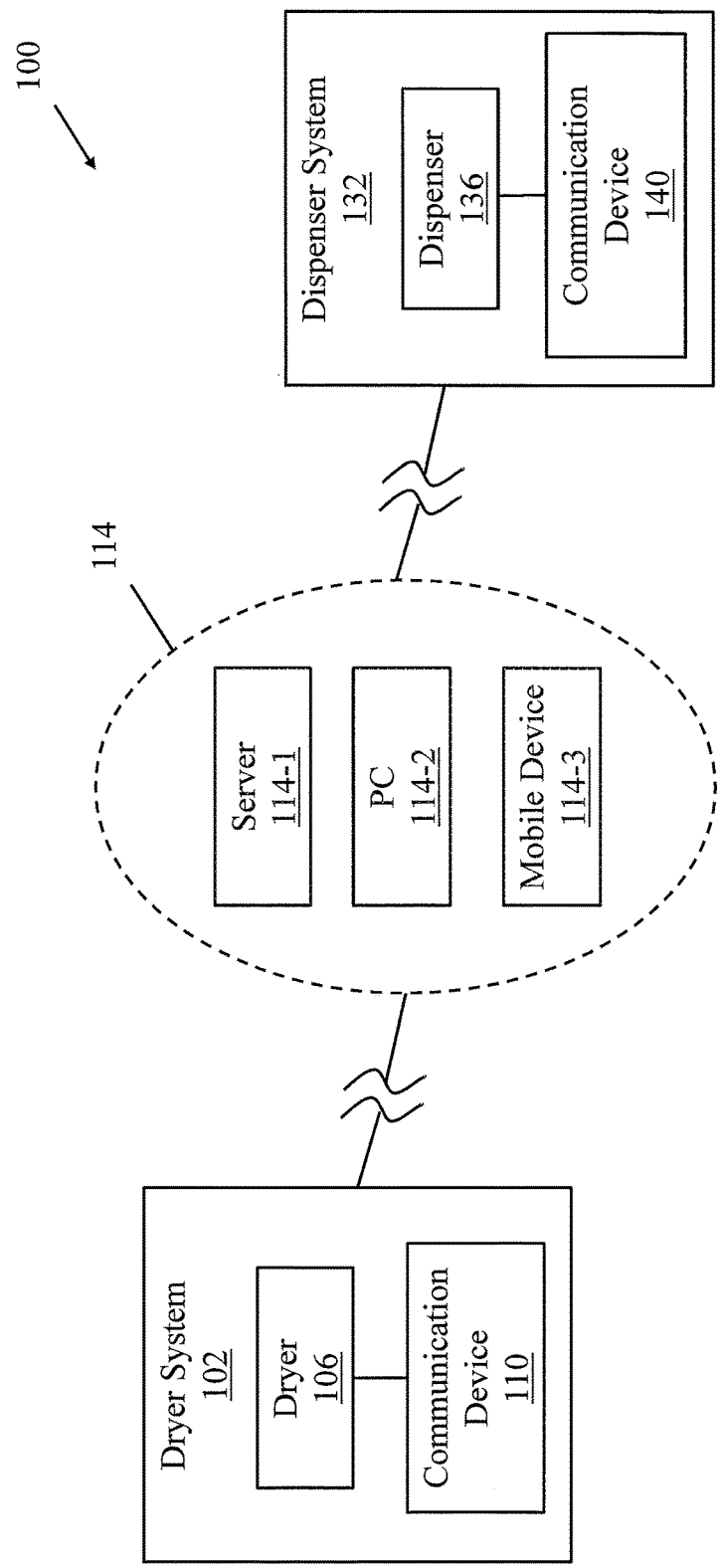
FIG. 1A illustrates a block diagram of an exemplary system.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may potentially incorporate one or more intervening entities.

In accordance with various aspects of the disclosure, apparatuses, systems and methods are directed to a dryer, such as a sanitizing hand dryer. The dryer may be in a publicly accessible location, such as a bathroom. In some embodiments, a communication interface is coupled to the dryer. As described further below, the communication interface may be used to obtain insight into various operational parameters associated with the dryer and may be used to control the dryer.

In accordance with various aspects of the disclosure, apparatuses, systems and methods are directed to a dispenser, such as for example a paper towel dispenser, a soap dispenser, a toilet tissue dispenser, etc. The dispenser may be in a publicly accessible location. In some embodiments, a communication interface is coupled to the dispenser. As described further below, the communication interface may be used to obtain insight into various operational parameters associated with the dispenser and may be used to control the dispenser.

In some embodiments, equipment/units (e.g., a dryer, a dispenser, etc.) may be coupled to one or more computing entities via one or more communication interfaces. A communication interface may include a wired communication interface and/or a wireless communication interface. A communications interface may adhere to, or be operative in accordance with, one or more communication techniques, standards, protocols, etc. In some embodiments, the communication interface may adhere to near field communications (NFCs), Wi-Fi communications, BLUETOOTH communications, etc.

Referring now to FIG. 1A, a block diagram of a system 100 in accordance with one or more embodiments is shown. Implementation details or implementation options known to skilled artisans have been omitted from FIG. 1A in order to avoid obscuring aspects of the instant disclosure.

The system 100 includes a dryer system 102. The dryer system 102 may correspond to a wall-mounted unit that may be accessed by a user to dry her hands following a washing of the same.

The dryer system 102 may include a dryer 106 (e.g., a forced air high speed hand dryer). The dryer 106 may include any number of components or devices (e.g., electromechanical components or devices) that may be utilized by the user to dry her hands. For example, the dryer 106 may include one or more of the components or devices that are described in the '799 publication. The dryer may be based upon the XLERATOR® hand dryer available from Excel Dryer, Inc., the assignee of the present application.

The system 100 may also include a dispenser system 132. The dispenser system 132 may correspond to a wall-mounted unit that may be accessed by the user to facilitate washing or drying of the user's hands. For example, the dispenser system 132 may include a dispenser 136 that may be configured to dispense one or more of soap, paper towels, tissue, etc.

Coupled to the dryer 106 is a communication device 110. The communication device 110 may be used to provide a communication interface between the dryer system 102 and one or more computing entities 114, potentially in association with one or more networks. Similarly, coupled to the dispenser 136 is a communication device 140. The communication device 140 may be used to provide a communication interface between the dispenser system 132 and the computing entities 114, potentially in association with the one or more networks.

While FIG. 1A shows the dryer system 102 and the dispenser system 132 as separate entities, in some embodiments one or more aspects of the dryer system 102 may be combined with one or more aspects of the dispenser system 132. In some embodiments, the communication device 110 may be the same as the communication device 140 (e.g., a common communication device may be used in connection with the dryer 106 and the dispenser 136).

The computing entities 114 may include any type of computing device, such as for example one or more of a server 114-1, a personal computer (PC) 114-2, a mobile device (e.g., a smartphone) 114-3, etc. As one skilled in the art would appreciate, one or more of the computing entities 114 (e.g., the server 114-1) may include a portal (e.g., an online portal) to facilitate connections/access to other links or sites.

In accordance with aspects of the disclosure, the communication device 110 may compute, maintain, or provide data or statistics regarding the use or operation of the dryer 106. The communication device 110 may be used to receive commands from a computing entity 114 to control or regulate the operation of the dryer 106, to perform a maintenance test or activity in association with the dryer 106, etc.

In accordance with aspects of the disclosure, the communication device 140 may compute, maintain, or provide data or statistics regarding the use or operation of the dispenser 136. The communication device 140 may be used to receive commands from a computing entity 114 to control or regulate the operation of the dispenser 136, to perform a maintenance test or activity in association with the dispenser 136, etc.

Figure 1B:
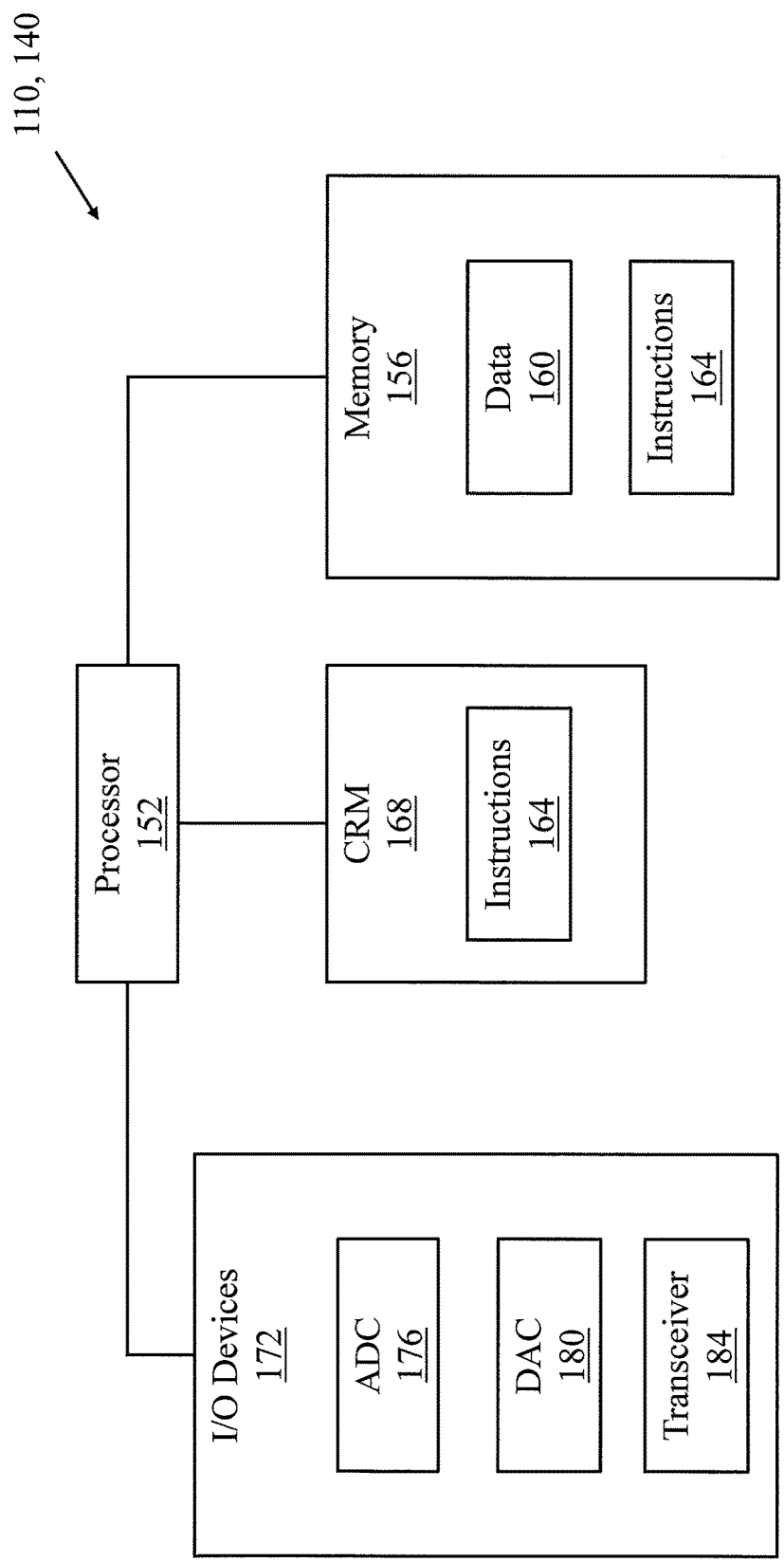
FIG. 1B illustrates a block diagram of an exemplary communication device.

Referring now to FIG. 1B, an example of the communication device 110/140 is shown. The communication device 110/140 includes one or more processors (generally shown by a processor 152) and a memory 156. The memory 156 may store data 160 and/or instructions 164. The communication device 110/140 may include a computer-readable medium (CRM) 168 that may store some or all of the instructions 164. The CRM 168 may include a transitory and/or non-transitory computer-readable medium.

The data 160 may include one or more parameters that may be associated with the operation or use of the dryer 106 or the dispenser 136 of FIG. 1A. Examples of the types of parameters that may be included are described below. The data 160 may include a specification of commands or directives regarding the use or functionality of the dryer 106 or the dispenser 136.

The communication device 110/140 may include one or more input/output (I/O) devices 172 that may be used to provide an interface between the communication device 110/140 and another entity. As an example, the I/O devices 172 may include an analog-to-digital converter (ADC) 176 that may be used to convert analog data indicative of the use of the dryer 106 or the dispenser 136 to a digital representation, for potential storage in the data 160. A digital-to-analog converter (DAC) 180 may convert one or more commands or directives (potentially stored or reflected in the data 160) that controls or regulates the operation of the dryer 106 or the dispenser 136 from a digital format to an analog format (e.g., an electrical signal or voltage) for use by the dryer 106 or the dispenser 136. A transceiver 184 may provide an interface for a transmission and reception of data 160 between the communication device 110/140 and, e.g., one or more of the computing entities 114 of FIG. 1A. Additional devices (not shown in FIG. 1B) may be included in the I/O devices 172, such as one or more buttons, keys, a mouse, a microphone, a speaker, a display or interactive screen, etc.

The instructions 164, when executed by the processor 152, may cause the communication device 110/140 to perform one or more methodological acts or processes, such as those described herein. As an example, execution of the instructions 164 may cause the communication device 164 to convey information or statistics (as potentially included in the data 160) to an entity (e.g., one or more computing entities 114 of FIG. 1A).

The communication device 110/140 may be operative in accordance with one or more communication specifications, protocols, or standards. For example, the communication device 110/140 may communicate using Wi-Fi communications, BLUETOOTH communications, etc. One of ordinary skill in the art will appreciate that the connectivity between two or more of the dryer system 102, the dispenser system 132, and the computing entity 114 may be established via a wireline connectivity, such as known serial or parallel wireline interfaces.

The organization of the various systems, components, and devices shown in FIGS. 1A-1B is illustrative. One skilled in the art will appreciate that a configuration different from what is shown in FIGS. 1A-1B may be used. For example, while the communication device 110 is shown in FIG. 1A as coupling to a single dryer 106, in some embodiments the communication device 110 may be coupled to a plurality of dryers 106. Similarly, a dryer 106 may be coupled to more than one communication device 110, such as in embodiments where a first communication device 110 supports a first communication type (e.g., Wi-Fi communications) and a second communication device 110 supports a second communication type (e.g., BLUETOOTH communications or wireline). Analogously, the communication device 140 may be coupled to a plurality of dispenser 136. A dispenser 136 may be coupled to more than one communication device 140.

Figure 2:
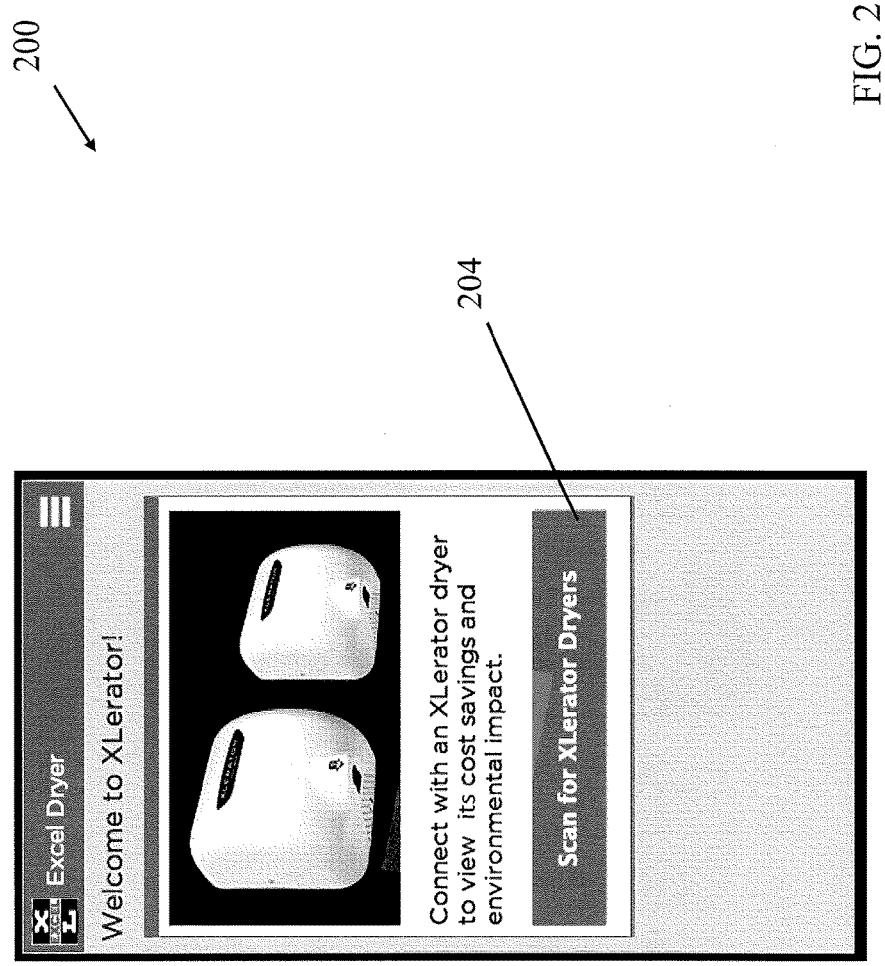
FIG. 2 illustrates an exemplary graphical user interface or graphic used in scanning for dryers.

Referring now to FIG. 2, a graphic 200 is shown. The graphic 200 may be implemented or presented on one or more devices, such as a computing entity 114 of FIG. 1A. The graphic 200 may correspond to a welcome or introduction screen that may be presented based on a selection of one or more programs or applications ("apps") on a computing entity 114. The graphic 200 may be used to initiate a scan for dryers, such as the dryer 106 of FIG. 1A. In this respect, the graphic 200 includes a button 204 (e.g., a soft button) that may be depressed or selected to initiate a scan.

Based on a selection of the button 204, the computing entity 114 (FIG. 1A) may execute a scan of one or more dryer systems 102 for purposes of identifying one or more dryers 106. As part of the scan, the computing entity 114 may attempt to establish communication (e.g., wirelessly) with one or more communication devices 110 (FIG. 1A).

Figure 3:
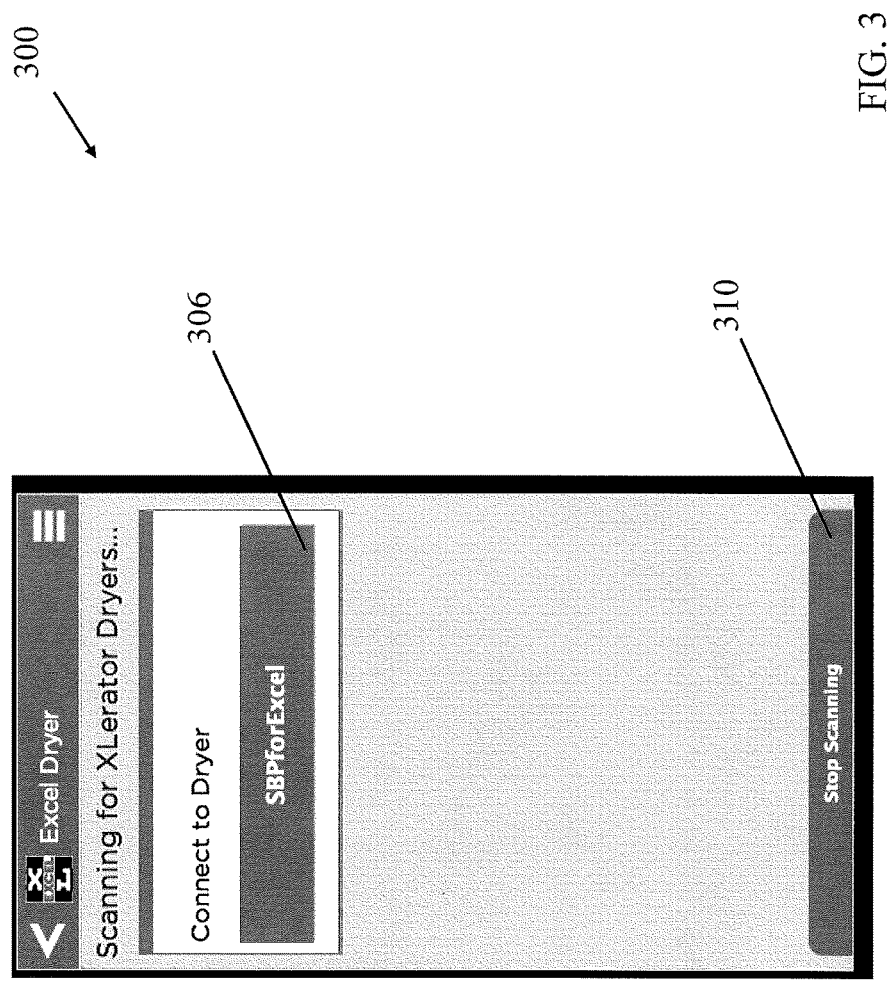
FIG. 3 illustrates an exemplary graphic identifying one or more dryers that have been identified based on a scan.

Assuming that the scan succeeds in establishing communication between the computing entity 114 and a dryer system 102 or portion thereof (e.g., a communication device 110), an identification of a dryer 106 may be provided as shown in the graphic 300 of FIG. 3. In particular, a button 306 may be presented on the computing entity 114 to allow a user to connect to the identified dryer 106. The button 306 may include a brief description or mnemonic associated with the dryer 106 to serve as an identification of the dryer 106. A button 310 may be provided to allow a user to stop the scanning. In some embodiments, the scanning may terminate automatically without a selection of the button 310 being made, such as upon an expiration of a predetermined timer.

Figure 4A:
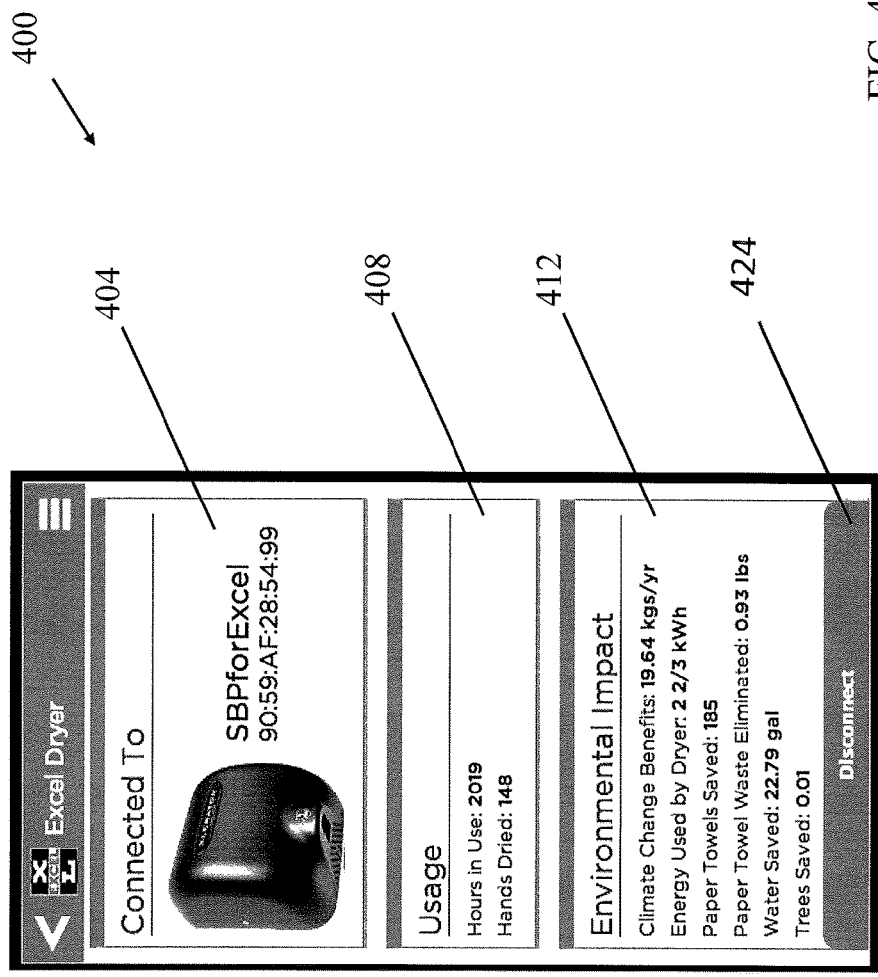
FIGS. 4A-4B illustrate exemplary graphics of various statistics for a connected dryer.
Figure 4B:
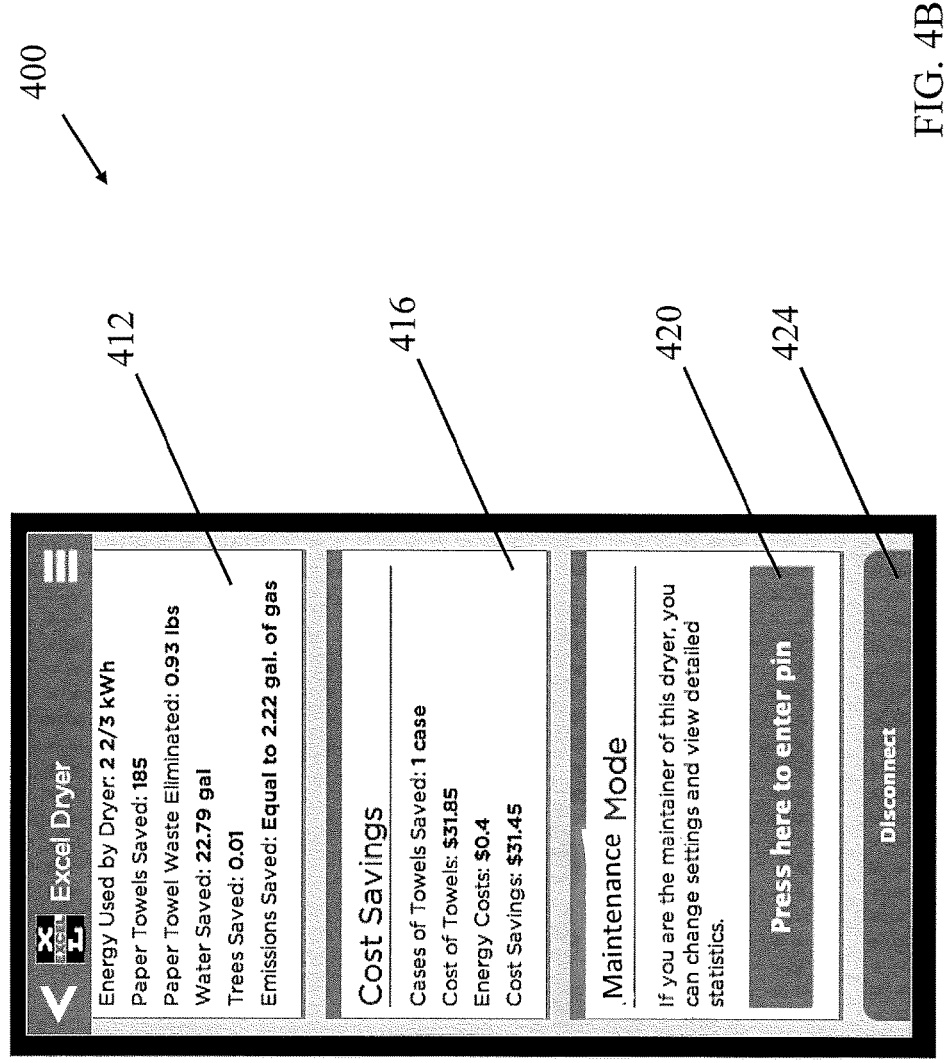

Referring to FIGS. 4A-4B, a graphic 400 is shown in association with a connected dryer (e.g., dryer 106). The graphic 400 may be presented on the computing entity 114 based on a selection of the button 306 of FIG. 3.

The graphic 400 includes details 404 regarding the dryer. The details 404 may include a specification of a make and model number of the dryer, serial number, a location of the dryer, a communication port or address of the dryer (or associated communication device 110), etc. A picture 406 of the dryer may be included as part of the details 404.

The graphic 400 includes usage statistics 408. The statistics 408 may include a specification of the time (e.g., hours) that the dryer is used and the number of hands dried (indicative of the number of times the dryer was turned on). The data may also track hourly use statistics to better understand periods of heavy usage.

The graphic 400 includes statistics 412 related to an environmental impact associated with the dryer. For example, the statistics 412 may include a specification of a climate change benefit, energy used by the dryer, paper towels saved (approximately), paper towel waste eliminated (based on paper towels saved), water saved (approximately), trees saved (approximately), and emissions saved (approximately).

The graphic 400 may include statistics 416 related to cost savings (FIG. 4B). For example, the statistics 416 may include estimates of towels saved, cost of towels or cost of towels saved, energy costs, and cost savings. The statistics 416 may be based at least in part on the statistics 412.

The graphic 400 may include a button 420 (FIG. 4B) that may be selected to change settings of the dryer. Selection of the button 420 may enable the computing entity 114 to obtain or display access to additional (e.g., more advanced) statistics regarding the use of the dryer.

The graphic 400 includes a disconnect button 424. The disconnect button 424 may be depressed or selected so as to disconnect the computing entity 114 from the dryer identified in the details 404.

Figure 5:
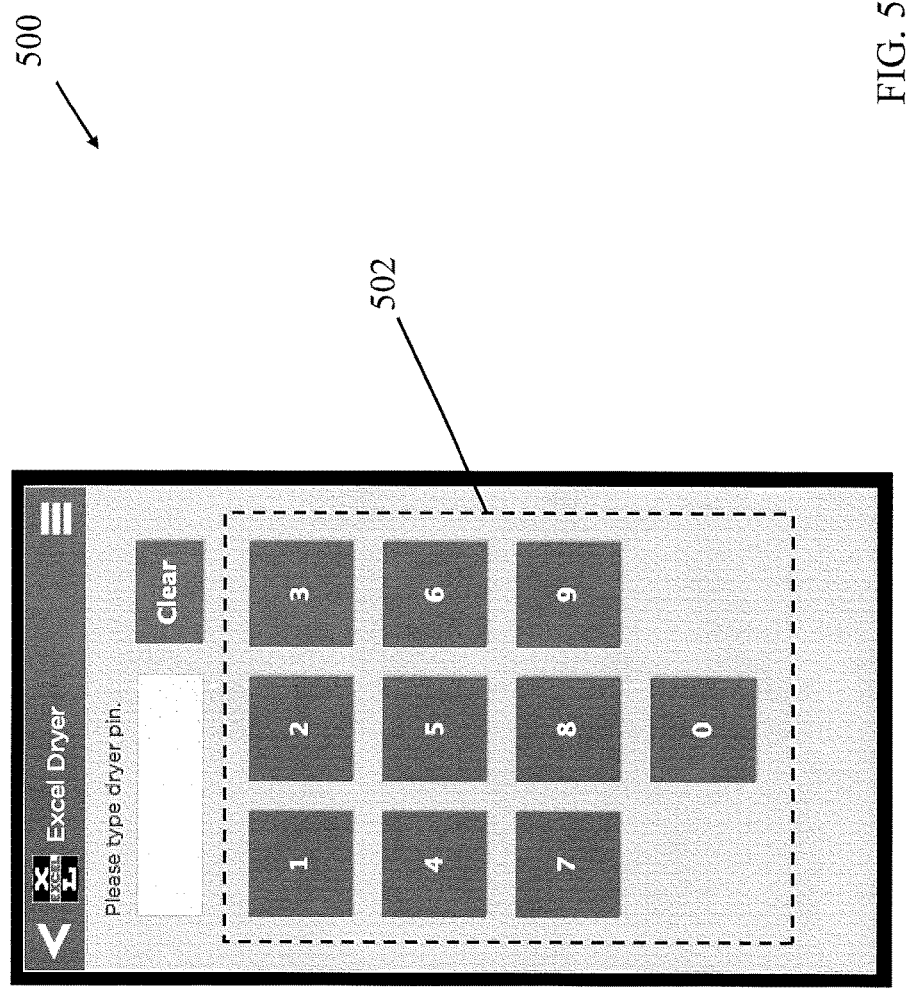
FIG. 5 illustrates an exemplary graphic for entering one or more credentials for accessing a dryer.

FIG. 5 illustrates a graphic 500 that may be presented on the computing entity 114. For example, the graphic 500 may be presented based on a selection of the button 420 of FIG. 4B. The graphic 500 may include one or more (alpha) numeric buttons 502 that may be used to enter a security credential, such as a personal identification number (PIN), a username, a password, etc. The credential may relate to the user of the computing entity 114. The credential may relate to the dryer 106 or communication device 110 that is being accessed.

Figure 6:
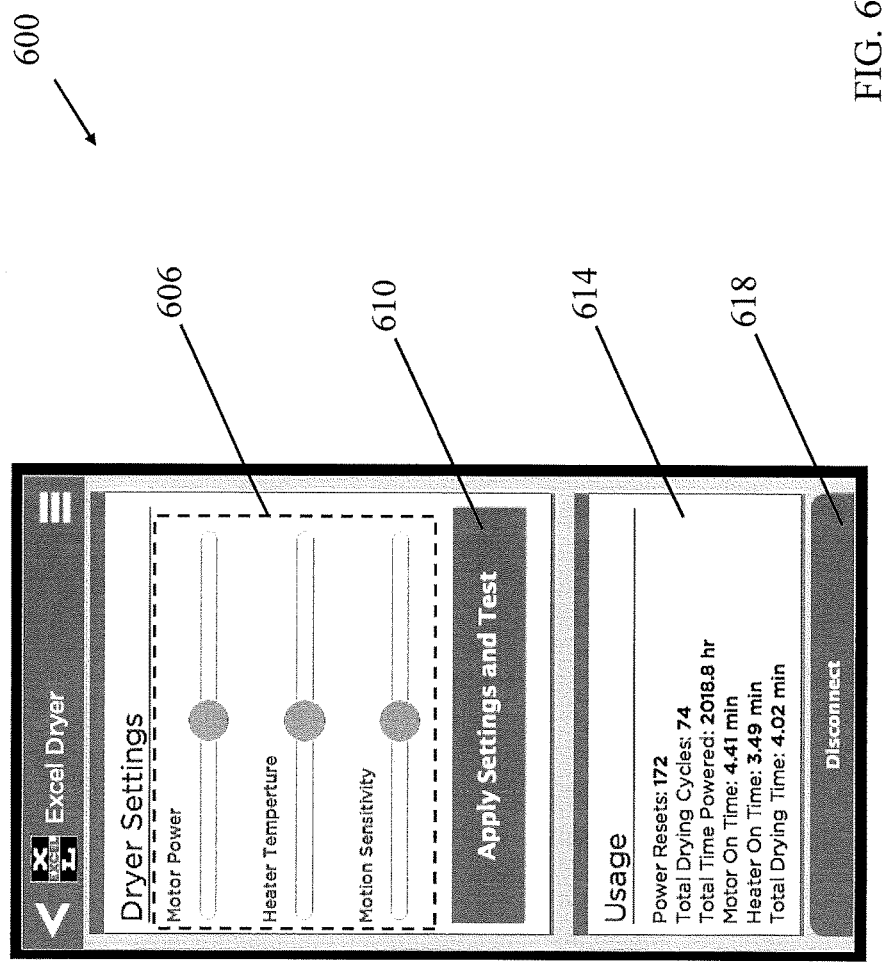
FIG. 6 illustrates an exemplary graphic for entering one or more settings or commands for controlling the operation of a dryer.

FIG. 6 illustrates a graphic 600 that may be presented on the computing entity 114. The graphic 600 may be presented based on a successful entry of the credential described above in association with FIG. 5.

The graphic 600 includes one or more dryer settings 606. For example, the dryer settings 606 may enable a user to adjust motor power/speed, heater temperature, or motion sensitivity associated with the connected dryer. FIG. 6 illustrates an adjustment of the settings 606 being provided via slide bars; one skilled in the art would appreciate that an adjustment of the settings 606 could be made using other techniques, such as a specification of a numerical value within a range of potential numerical values.

The graphic 600 includes a button 610 that may be selected to confirm the settings 606. As part of the selection of the button 610, one or more tests may be invoked by the dryer. For example, the tests may be invoked as part of a debugging effort or a maintenance activity.

The graphic 600 includes usage statistics 614. For example, the statistics 614 may include a specification of power resets, total drying cycles, total time that the dryer is powered on, a time that a motor associated with the dryer is on, a time that a heater associated with the dryer is on, and a total drying time. The statistics 614 may be associated with a test that may be performed as part of the selection of the button 610.

The graphic 600 includes a disconnect button 618. The disconnect button 618 may be depressed or selected so as to disconnect the computing entity 114 from the dryer. The disconnect button 618 may correspond to the disconnect button 424 of FIGS. 4A-4B.

Figure 7:
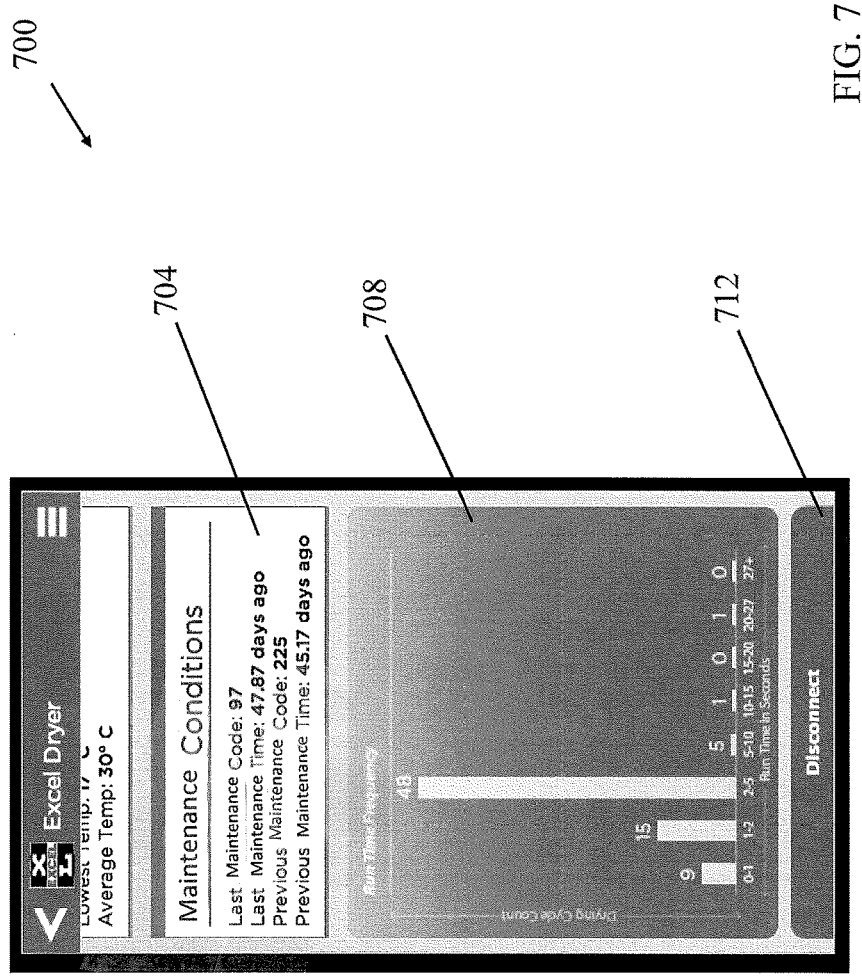
FIG. 7 illustrates an exemplary graphic for providing statistics in association with one or more maintenance conditions or activities.

FIG. 7 illustrates a graphic 700 that may be presented on the computing entity 114. The graphic 700 may be presented based on a successful entry of the credential (e.g., pin) described above in association with FIG. 5 and/or a selection of the button 610 of FIG. 6.

The graphic 700 includes maintenance condition information 704. For example, the maintenance condition information 704 may include a specification of a last maintenance code, a last maintenance time, a previous or prior maintenance code, and an amount of time since maintenance was last performed. The dryer may also provide detected fault information to one or more of the computing entities 114 (FIG. 1A) (e.g., to an individual smart phone, a centralized monitoring station, et cetera) via the communication device 110 (FIG. 1A).

The graphic 700 includes a plot 708 of run time frequency in terms of drying cycle count (depicted on the vertical axis) versus dryer run time in seconds (depicted on the horizontal axis).

The graphic 700 includes a disconnect button 712. The disconnect button 712 may be depressed or selected so as to disconnect the computing entity 114 from the dryer. The disconnect button 712 may correspond to the disconnect button 618 of FIG. 6 and/or the disconnect button 424 of FIGS. 4A-4B.

While the examples described above in connection with FIGS. 2-7 related to a dryer (e.g., dryer 106) or a dryer system (e.g., dryer system 102), one skilled in the art would appreciate, based on a review of this disclosure, that similar examples could be constructed with respect to a dispenser (e.g., dispenser 136) or a dispenser system (e.g., dispenser system 132).

While some of the examples described herein related to a visual presentation of information and data, one skilled in the art will appreciate that other forms of presenting information and data may be used. For example, information or data may be presented in an auditory fashion, potentially based on speech recognition techniques or algorithms.

Aspects of the disclosure have been described that enable statistics to be obtained regarding the use and operation of sanitation equipment/units (e.g., a dryer, a dispenser, etc.) that are frequently used in connection with the promotion of personal hygiene. Those statistics may potentially be utilized as part of a maintenance activity to maintain the units in good working order or may be used to identify trends or hidden risks such as cost/waste. In accordance with aspects of the disclosure, the statistics may be analyzed to identify energy usage and washroom footfall reporting. The statistics may be analyzed to determine/schedule a cleaning activity associated with a bathroom in which the sanitation units are located.

Access to a unit may be facilitated through the use of one or more communication techniques. Connection to a unit (or associated communication device or interface) may be secured via one or more credentials.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A system comprising:
    a forced air hand dryer;
    a communication device coupled to the forced air hand dryer and configured to communicatively couple to a computing entity in order to wirelessly provide data regarding the use of the forced air hand dryer to the computing entity;
    a dispenser; and
    a second communication device coupled to the dispenser and configured to communicatively couple to at least one of the computing entity or a second computing entity in order to provide second data regarding the use of the dispense,
    wherein the communication device wirelessly provides an identification of the forced air hand dryer to the computing entity based on a wireless scan initiated by the computing entity,
    wherein the data also comprises statistics regarding the use of the forced air hand dryer and maintenance condition information of the forced air hand dryer,
    wherein the data comprises at least one setting associated with the forced air hand dryer and the communication device receives an adjustment to the at least one setting and applies the adjustment to the forced air hand dryer,
    wherein the second communication device is different from the communication device,
    wherein the data is protected via a credential that comprises at least one of a personal identification number, a username, and a password.

2. The system of claim 1, wherein the communication device comprises a transceiver configured to communicate with the computing entity in accordance with at least one of Wi-Fi communications and BLUETOOTH communications.

3. The system of claim 1, wherein the data relates to at least one of a cost associated with the use of the forced air hand dryer and a cost savings associated with the use of the forced air hand dryer.

4. The system of claim 1, wherein the at least one setting comprises at least one of a motor power setting, a heater temperature setting, and a motion sensitivity setting.

5. The system of claim 1, wherein the communication device applies the adjustment to the forced air hand dryer as part of a test of the forced air hand dryer, and
    wherein the computing entity comprises at least one of a server, a personal computer, and a mobile device.

6. The system of claim 1, wherein the data is configured to be analyzed to identify at least one of cost and waste in a bathroom in which the forced air hand dryer is located.

7. The system of claim 1, wherein the data is configured to be analyzed to schedule a maintenance activity in a bathroom in which the forced air hand dryer is located.

8. The system of claim 1, wherein the dispenser is configured to dispense at least paper towels.

9. The system of claim 1, wherein the second data comprises at least one setting associated with the dispenser, wherein the at least one setting is configured to control at least one operation associated with the dispenser.

* * * * *